United States Patent
Trowbridge

(10) Patent No.: US 6,460,836 B1
(45) Date of Patent: *Oct. 8, 2002

(54) PRESS TOGETHER AIR SPRING

(75) Inventor: Mark Guy Trowbridge, Stow, OH (US)

(73) Assignee: The Goodyear Tire & Rubber Company, Akron, OH (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 83 days.

(21) Appl. No.: 09/116,297

(22) Filed: Jul. 16, 1998

Related U.S. Application Data

(63) Continuation-in-part of application No. 08/816,973, filed on Mar. 13, 1997.

(51) Int. Cl.[7] .................................................. F16F 9/04
(52) U.S. Cl. .................................. 267/64.27; 267/64.21
(58) Field of Search ........................... 267/64.21, 64.23, 267/64.24, 64.27, 118, 122, 140

(56) References Cited

U.S. PATENT DOCUMENTS

| | | | |
|---|---|---|---|
| 3,033,558 A | 5/1962 | Slemmons et al. ........... 267/65 |
| 3,043,582 A | 7/1962 | Hirtreiter ..................... 267/65 |
| 3,596,895 A | 8/1971 | Hirtreiter ..................... 267/65 |
| 4,506,910 A | * 3/1985 | Bierens ................... 267/64.21 |
| 4,718,650 A | 1/1988 | Geno ....................... 267/64.27 |
| 4,787,606 A | 11/1988 | Geno et al. .............. 267/64.27 |
| 4,798,369 A | 1/1989 | Geno et al. .............. 267/64.11 |
| 5,060,916 A | * 10/1991 | Koschinat et al. ....... 267/64.27 |
| 5,201,499 A | * 4/1993 | Elliott et al. ............. 267/64.27 |
| 5,201,500 A | * 4/1993 | Ecktman et al. ......... 267/64.27 |
| 5,326,082 A | 7/1994 | Ecktman et al. ......... 267/64.27 |
| 5,382,006 A | 1/1995 | Arnold .................... 267/64.27 |
| 5,535,994 A | 7/1996 | Safreed, Jr. .............. 267/64.27 |
| 5,671,907 A | 9/1997 | Arnold .................... 267/64.27 |

* cited by examiner

Primary Examiner—Jack Lavinder
Assistant Examiner—Mariano Sy
(74) Attorney, Agent, or Firm—Nancy T. Krawczyk

(57) ABSTRACT

An improved composite air spring with a simplified construction is disclosed. The piston is has a series of internal floating ribs. The ribs extend from the underside of the piston platform to the lower end of the piston. Circumferential forces acting on the piston when the sleeve rolls down onto the piston are absorbed by the piston and the floating ribs.

10 Claims, 3 Drawing Sheets

PRESS TOGETHER AIR SPRING

RELATED U.S. APPLICATION DATA

The present U.S. patent application is a continuation-in-part of U.S. patent application Ser. No. 08/816,973, filed Mar. 13, 1997, currently pending.

TECHNICAL FIELD

This invention is directed toward a composite air spring. More specifically, the air spring is comprised of a structurally supported piston that maintains the cylindrical configuration under high force.

BACKGROUND ART

Composite air springs are well known in the art. Examples of known air springs are illustrated in U.S. Pat. Nos. 3,033,558, 3,043,582, 3,596,895, 4,718,650, 4,787,606, 4,798,369, 5,201,500, 5,326,082, 5,535,994, 5,382,006, and 5,671,907.

Some of these air springs are provided with internal bumpers. Internal bumpers prevent the upper and lower retainers from striking one another when the force exerted upon the bumper is greater than spring of the elastomeric sleeve.

Rolling lobe air springs, such as illustrated in U.S. Pat. No. 5,535,994, are provided with pistons. The pistons provide both a means for mounting the air spring and a surface for the rolling lobe sleeve to travel upon when the air spring is subjected to forces upon the upper surface of the air spring. The piston is subjected to multiple forces. Radial forces are transmitted to the piston by means of contact with the upper retainer or transmitted through the bumper. The piston is subjected to circumferential forces by the sleeve folding down and embracing the sides of the piston.

To withstand the forces acting upon the piston, pistons have been formed from metal, such as in U.S. Pat. Nos. 5,382,006 and 5,671,907. Pistons have also been formed of hard thermoplastic. To enable the thermoplastic piston to withstand the forces to which it is subjected, the pistons have been formed with very thick walls, such as shown in U.S. Pat. No. 4,718,650, or formed in a nested tube configuration. Both of these methods require the use of large amounts of material to achieve the desired durability and endurance characteristics required of the piston.

A third common construction is the formation of ribs extending from the inner piston wall to an internal column. However, as the sleeve rolls down the piston, due to the circumferential forces generated, the location of the piston reinforced by the rib remains rigid while the locations of the piston between the ribs would exhibit a spring-like reaction. The constant flexing of the piston sidewalls due to the alternating rigid and spring-like areas may lead to cracking of the piston.

The inventive air spring and piston disclosed has a construction yielding reduced manufacturing costs, and a piston capable of withstanding greater burst and crush strengths and greater endurance under the subjected circumferential and radial forces.

SUMMARY OF THE INVENTION

In accordance with the present invention, a new and improved air spring assembly is provided.

An object of the present invention is an improved composite air spring with reduced manufacturing costs.

Another object of the present invention is an improved composite air spring wherein the circumferentially forces acting upon the piston are absorbed by the piston.

Another object of the present invention is an improved composite air spring wherein under high forces the cylindrical configuration of the piston is maintained.

The objects of the present invention are realized by an air spring construction comprising spaced end members and an internal bumper that absorbs shock upon the air spring experiencing severe deflections, and prevents the spring from total collapse.

Another aspect of the invention is an air spring comprising a piston formed with supporting and strengthening members that move with the compressive forces acting upon the piston during operation of the air spring.

Another aspect of the invention is an air spring comprising a piston formed with internal ribs that float, or move, with the compressive forces acting upon the piston during operation of the air spring.

BRIEF DESCRIPTION OF DRAWINGS

The invention will be described by way of example and with reference to the accompanying drawings in which.

DESCRIPTION OF THE PREFERRED EMBODIMENTS

Figure 1:
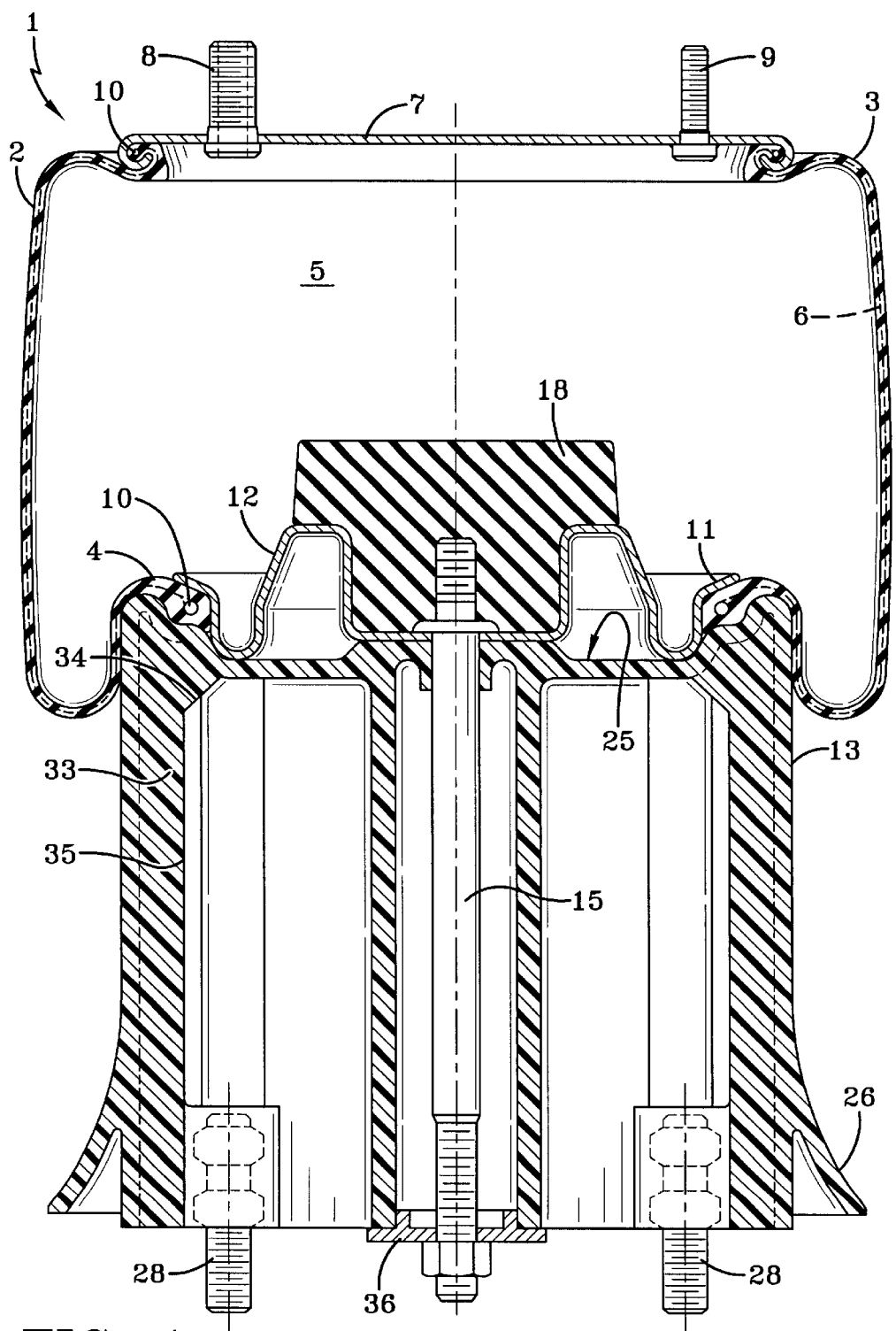
FIG. 1 is a cross-sectional view of the air spring.

FIG. 1 is illustrative of an example of the present invention, a rolling lobe air spring 1. An elastomeric sleeve 2 is sealingly engaged at both ends 3,4 to form a pressurized chamber 5 within the air spring 1. For reinforcement of the sleeve 2, at least one layer of reinforcement 6 may be provided within the sleeve. The reinforcement layer 6 is formed of cords such as conventional polyester, nylon, aramid, or steel. The chosen reinforcement material is determined by the forces to which the air spring will be subject upon use. The sleeve 2 length varies depending upon the end use of the air spring.

The upper end of the sleeve 3 is secured to an upper retainer plate 7. The upper retainer 7 has a combination stud 8 permitting the fluid to flow into the pressurized chamber 5. The preferred fluid introduced into the air spring 1 is air. The upper retainer 7 may also be provided with a mounting stud 9. The upper end of the sleeve 3 is illustrated as being attached to the upper retainer 7 by an interlocking construction. In such a construction, the sleeve 2 may be provided with internal beads 10 to strengthen the attachment. The sleeve 2 may be attached to the upper retainer 7 by other known conventional manners, such as snapping the sleeve onto the retainer or the use of a bead retaining ring located outward of the sleeve as illustrated in U.S. Pat. No. 5,535,994.

The lower end of the sleeve 4 is captivated between the outer flange 11 of the lower retainer 12 and the air spring piston 13. The lower end of the sleeve 4 has a bead 10 for retention on the lower retainer 12. The beads 10 located at the upper and lower ends of the sleeve 2 may be steel cable wires, as well as other known conventional air spring bead construction materials.

Figure 2:
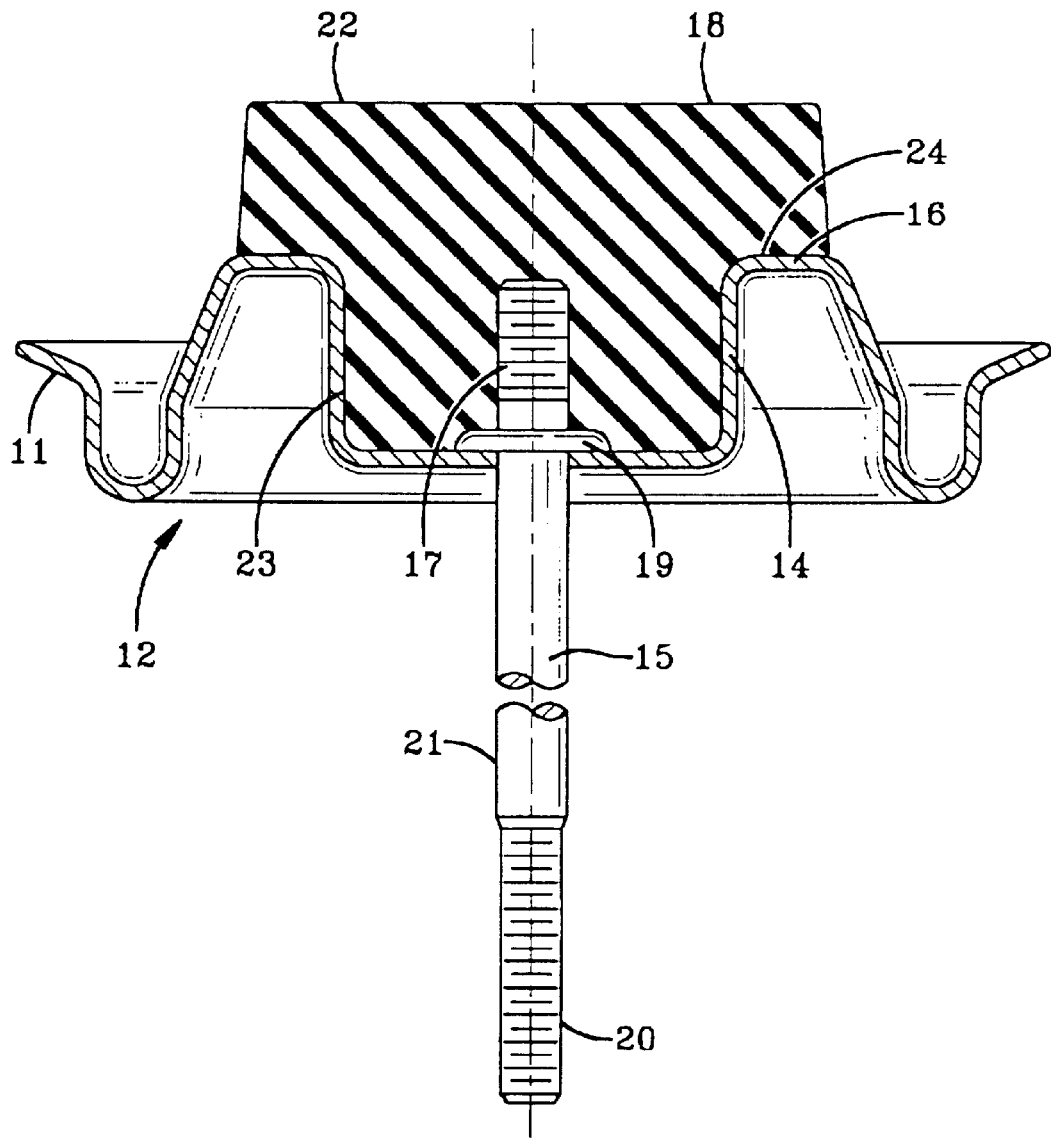
FIG. 2 is a cross-sectional view of the bumper and lower retainer.

As illustrated in FIG. 2, the lower retainer 12 is of a unitary symmetrical construction, defined by the external flange 11, a central pocket 14, and a central post 15. The central pocket 14 has a cup-like configuration, the sides of the pocket rising to form a ledge 16. Adjacent the ledge 16, the retainer slopes downward into the external flange 11. The lower retainer 12 is a steel stamping, but may be of any conventional air spring plate retainer material capable of providing the desired properties as discussed above.

Centrally located within the pocket 14 is the post 15. The illustrative example is a threaded and collared post 15. The upper end of the post 15 has a series of barbs 17, for assistance in securing fitment of the bumper 18 to the post 15. The collar 19 is for attachment of the post 15 to the lower retainer 12. The collared portion 19 of the post 15 may be separated from the threaded end 20 by a smooth shaft portion 21. The smooth shaft portion 21 lengthens the post 15 for attachment of the lower retainer 12 to the piston 13 and mounting of the air spring 1. Conversely, the post 15 may terminate within a short distance of the underside of the pocket 14.

The bumper 18 has a plug-like configuration. The bumper top 22 is flat surface with an external diameter. The opposing end 23 of the bumper 18 has a smaller diameter, corresponding to the diameter of the lower retainer pocket 14. The differing diameters create a shoulder 24 which, when the bumper 18 is pressed onto the post 15, rests on the retainer ledge 16. The radial height of the bumper 18 may vary depending upon the desired spring characteristics sought and the selected bumper material. The bumper 18 may be formed of conventional air spring bumper materials, such as thermoplastic, thermoelastics, or thermosets.

When the bumper 18 is formed of rubber and the post 15 and lower retainer 12 are steel, the advantage of the differing thermal coefficients can be utilized. The coefficient of friction between the coated steel and the rubber bumper ensures that the plug-like bumper 18, when pressed into the cuplike steel retainer pocket 14 with the steel post 15, maintains it integrity over both wide temperatures and load application ranges.

Figure 3:
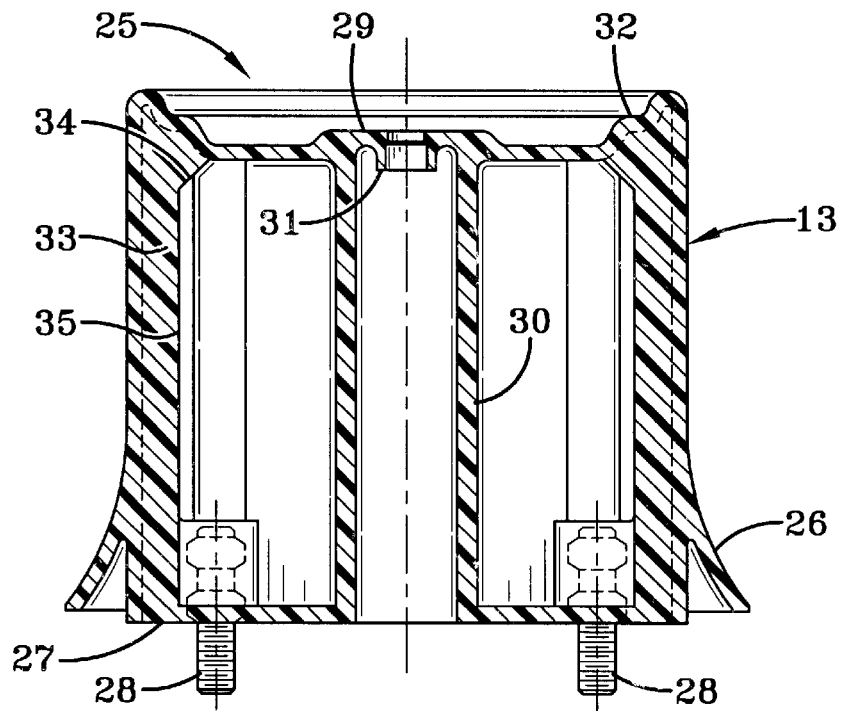
FIG. 3 is a cross-sectional view of the piston.
Figure 4:
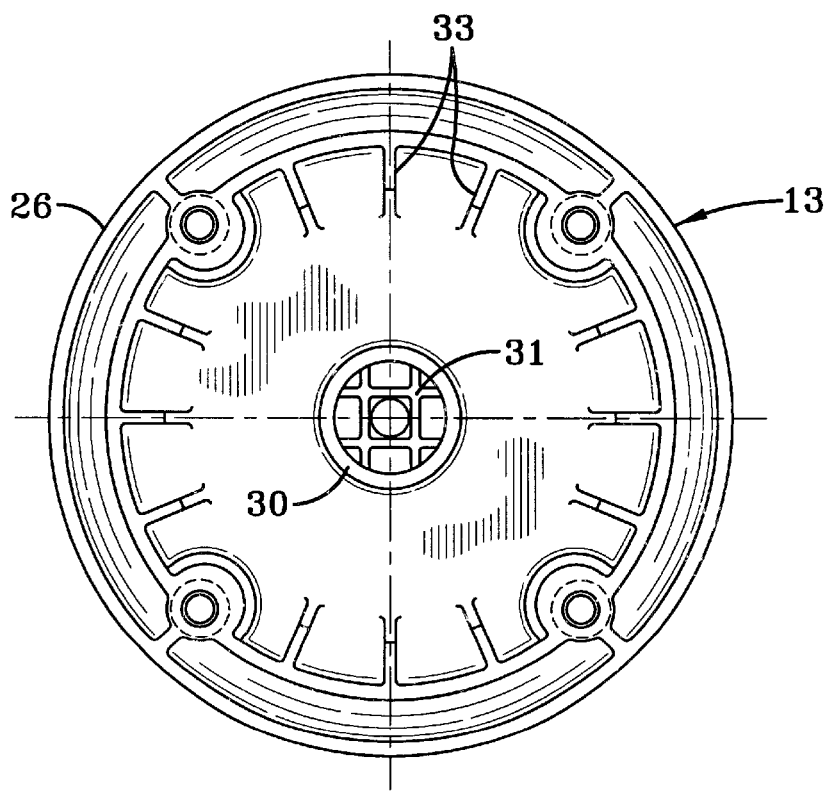
FIG. 4 is a cut view of the piston.

The piston 13 is formed of a hard thermoplastic. As illustrated in FIGS. 3 and 4, the piston 13 has an overall cylindrical configuration. The top surface of the piston 13 is defined by a recessed deck 25, and the lower portion of the piston 13 has a flared skirt 26. The bottom surface 27 of the piston 13 is provided with mounting means, for mounting the air spring 1 in its operating location. Illustrated are two mounting studs 28; however, as seen in FIG. 4, means for a plurality of mounting studs 28 may be provided. Alternatively, if permissible by the intended use of the air spring 1, the mounting studs 28 may be excluded and the mounting accomplished by the extending threaded end 20 of the central post 15. An end plate (not shown) may extend across the entire bottom surface of the piston for reducing accumulated dirt within the piston during operation.

The piston deck 25 has a raised central portion 29 corresponding to the base of the lower retainer pocket 14. Internal of the raised central portion 29, approximately corresponding to the circumference of the raised central portion 29, is an extending internal column 30. The column 30 is illustrated as extending the full depth of the piston 13, but may terminate short of the piston end.

Under the raised central portion 29 is a set of crossed ribs 31. The use of a set of crossed ribs 31 reduces the amount of material under the piston deck 25, but provides sufficient material to withstand torque-up forces up to 5,000 lbs. The ribs 31 help prevent cracks from occurring in the column 30 when the air spring is assembled. The raised material is illustrated as a set of crossed ribs 31, but may take on alternative constructions such as concentric rings.

A ledge 32, with a height greater than the raised central portion 29, is spaced from the raised central portion 29. Internal of the ledge 32 is a series of spaced floating ribs 33. The ribs 33 are connected along the axially outer length of the ribs to the inner surface of the piston 13. The opposing edges 35 of the ribs terminate prior to any contact with any other portion of the piston 13. The ribs 33 tie together the two rigid portions of the piston together, that is, the upper deck region and the lower region which are both rigid due to changes of configuration in two different planes. Since the ribs 33 are not to connected the internal column, when the sleeve 2 rolls down the piston 13, the ribs, while strengthening the piston walls, permit the piston to flex in the circumferential direction, "floating" with the acting forces. The floating action of the ribs takes advantage of the deflections of the piston, enabling the piston to absorb the circumferential forces, increasing the endurance of the piston.

Since the ribs 33 serve to connect the two rigid portions of the piston, the length and construction of the ribs 33 may vary. FIG. 3 illustrates the ribs extending the full length of the piston; however, the ribs may terminate before the piston end, as long as the rigid portions of the piston are connected. For such a construction, the floating ribs will terminate in the lower region wherein the piston configuration begins to change in multiple planes, approximately where the piston begins to flare and form the skirt 26. Alternatively, the ribs may be connected for a short distance to the column 30 at the lower end of the piston 27. The ribs 33 may be defined by the same widths, or more than two different widths.

The ribs 33 have a cantilevered edge 34 at the upper end, extending from the edge 35 of the ribs 33 to the underside of the piston deck. The cantilevered edge 34 is inclined at an angle within the range of 35° to 55° relative to the edge 35. The ribs 13 are spaced about the internal circumference of the piston 13.

FIG. 4 illustrates a series of twelve ribs 33, the ribs 33 have a thickness less than the thickness of the outer cylindrical piston walls and the column 30. The illustrative piston 13 is but one example of the floating rib 33 configuration within the scope of the present invention. The number of ribs 33 may also vary. The variations of widths, number and spacing of the ribs 33 are determined by the desired physical properties of the piston, while realistically limited by manufacturing ability and costs.

The floating ribs 33 maximize the piston strength and endurance, thereby increasing the life of the air spring. The ribbed piston 13 is capable of withstanding greater burst and crush values than conventional pistons. The cantilevered edges 34 of the ribs 33 from the underside of the piston deck provide support for maintaining the cylindrical configuration of the piston 13 under heavy fatigue stress.

Assembly of the Air Spring

The air spring is assembled in the following manner. The sub-assembly of the lower retainer 12 is prepared by securing the post 15 in the pocket 14. The collar 19 of the post 15 limits the length of the post 15 projecting into the pocket 14. The bumper 18 is then simultaneously pressed over the post 15 and into the pocket 14, creating secure bumper retention throughout a wide range of operating temperatures.

The sleeve 2 may be attached in several ways. One method first attaches the sleeve to the lower retainer 12 before the post and the bumper are secured to the lower retainer 12. An alternative method is by attaching the sleeve 2 to the upper retainer 7, creating a second subassembly, and then securing this sleeve/upper retainer sub-assembly to the bumper/lower retainer sub-assembly.

After the sleeve 2 is secured to the lower retainer 12, the post 15 is inserted into the raised central portion 29 of the piston 13. The unit is secured by means of a locking nut 36 at the threaded end 20 of the post 21.

I claim:

1. An air spring comprising a flexible cylindrical sleeve secured at opposing ends, and a piston, the piston being formed from thermoplastic and comprising an upper surface, an outer cylindrical wall having an outer lower end terminating in a flared skirt configuration, and internal means for absorbing and deflecting circumferential forces, the absorbing and deflecting means extending from the upper surface toward the lower end of the piston along the length of the piston to at least a location wherein the outer lower end of the piston begins to flare, and the absorbing and deflecting means having a thickness less than the thickness of the outer cylindrical wall.

2. An air spring in accordance with claim 1 wherein the absorbing and deflecting means extend the fill length of the piston.

3. An air spring in accordance with claim 1 or 2 wherein the absorbing and deflecting means are ribs extending from the internal piston wall.

4. An air spring in accordance with claim 3 wherein the piston comprises a central column, and the lower end of the ribs are connected to the column.

5. An air spring in accordance with claim 1 wherein the upper surface of the piston comprises a series of internal raised formations.

6. An air spring in accordance with claim 1 wherein the piston comprises a central column and the absorbing and deflecting means are connected to the column in at least one location.

7. An air spring comprising an upper retainer, a lower retainer, a flexible cylindrical sleeve connected at one of its ends to the upper retainer and at an opposite end to the lower retainer, a bumper and a piston, the piston being formed from thermoplastic and comprising a cylindrical central portion, the central portion defining an internal piston wall, an upper surface defining a seat for the lower retainer, an outer cylindrical wall having an outer lower end terminating in a flared skirt configuration, and internal floating ribs, the floating ribs extending along the internal piston wall to at least a location wherein the outer lower end of the piston begins to flare and extending axially inward from the internal piston wall, and the floating ribs having a thickness less than the thickness of the outer cylindrical wall.

8. An air spring in accordance with claim 7 wherein the floating ribs extend the full length of the internal piston wall.

9. An air spring in accordance with claim 7 wherein the piston comprises a central column and the floating nibs are connected to the column in at least one location.

10. An air spring in accordance with claim 7 wherein the bumper is mounted on the lower retainer, and characterized by:

the lower retainer comprising a central depression, the bumper comprising a central extending portion, the bumper central portion being pressed into the central depression of the lower retainer.

* * * * *